(12) United States Patent
Koster

(10) Patent No.: US 6,253,081 B1
(45) Date of Patent: Jun. 26, 2001

(54) METHOD AND SYSTEM FOR PROVIDING ROAMING SERVICE IN A TELECOMMUNICATIONS SYSTEM THAT IS PARTIALLY ENABLED FOR LOCAL NUMBER PORTABILITY

(76) Inventor: Karl Koster, 5880 Pine Brook Rd. NE., Atlanta, GA (US) 30328

(*) Notice: Subject to any disclaimer, the term of this patent is extended or adjusted under 35 U.S.C. 154(b) by 0 days.

(21) Appl. No.: 09/133,059

(22) Filed: Aug. 12, 1998

(51) Int. Cl.[7] .................................................. H04Q 7/22
(52) U.S. Cl. ........................ 455/433; 455/435; 455/445
(58) Field of Search ................................... 455/433, 432, 455/435, 445, 414, 415, 405, 406, 456

(56) References Cited

U.S. PATENT DOCUMENTS

| | | | |
|---|---|---|---|
| 5,832,382 | * 11/1998 | Alperovich | 455/435 |
| 6,006,098 | * 12/1999 | Rathnasabapathy et al. | 455/433 |
| 6,049,714 | * 4/2000 | Patel | 455/433 |
| 6,064,887 | * 5/2000 | Kallioniemi et al. | 455/445 |

FOREIGN PATENT DOCUMENTS 2 234 883   6/1990   (GB).

OTHER PUBLICATIONS

Notification of Transmittal of the International Search Report or the Declaration International Filing Date.
Wireless Local Number Portability, Kenneth A. Gustafson, 1998 Annual Review of Communications, pp. 889–895.
"CTIA Report on Wireless Number Portability," created by the Number Portability Sub–task Group on behalf of the Cellular Telecommunications Industry Association Number Advisory Group, Draft Version 2.0, printed Apr. 27, 1998.
"North American Numbering Council, Local Number Portability Administration Working Group Report on Wireless Wireline Integration," dated May 8, 1998.

* cited by examiner

Primary Examiner—Edward F. Urban

(57) ABSTRACT

A system for providing roaming service in a telecommunications system that is partially enabled for local number portability (LNP). A new LNP protocol element is defined for registration notification messages. A roaming cellular mobile radiotelephone (CMR) transmits its mobile identification number (MIN) in a registration request, which is received by a host mobile switching center (MSC). The first six digits of the CMR's MIN uniquely identifies the CMR's home MSC. The host MSC validates the roaming CMR by sending a registration notification message, including the CMR's MIN, to the CMR's home location register (HLR), which is maintained at the CMR's home MSC or at a clearinghouse. If the host MSC is LNP enabled, it sets the LNP protocol element in the registration notification message. If the host MSC has not been upgraded for LNP, it will not be configured to set the LNP protocol element in the registration notification message. Upon receiving the registration notification message, the CMR's HLR checks the LNP protocol element to determine whether the host MSC is LNP enabled. If the host MSC is LNP enabled, the CMR's HLR returns a validation response message to the host MSC authorizing the CMR for automatic roaming service. If the host MSC is not LNP enabled, the CMR's HLR returns a validation response message to the host MSC authorizing the CMR for restricted roaming service.

25 Claims, 5 Drawing Sheets

METHOD AND SYSTEM FOR PROVIDING ROAMING SERVICE IN A TELECOMMUNICATIONS SYSTEM THAT IS PARTIALLY ENABLED FOR LOCAL NUMBER PORTABILITY

TECHNICAL FIELD

The present invention relates generally to wireless telecommunications systems, and more particularly, relates to a method and system that will allow partial local number portability (LNP) implementation while maintaining roaming service in those networks or switches that are not LNP enabled.

BACKGROUND OF THE INVENTION

Roaming is the ability to obtain wireless telephone service using a cellular mobile radiotelephone (CMR) that is located outside the area served by the CMR's home wireless telephone service provider. A large number of wireless telephone service providers have entered into contractual arrangements that allow CMRs associated with accounts in good standing to obtain roaming service throughout most of the United States, Canada and other areas in the North American Number Plan (NANP). The NANP specifies a format for telephone numbers that consists of an number plan area (NPA or area code), a 3 digit central office code, and 4-digit line number. This is frequently depicted as "NPA-NXX-XXXX." The subscriber who is responsible for the CMR's account receives a unified bill from his or her home wireless telephone service provider that includes charges for home as well as roaming service. Once the bill is paid, the CMR's home wireless telephone service provider forwards appropriate proceeds to the other carriers that provided the CMR with roaming service.

Local number portability (LNP) is the ability to retain the same directory number while changing service providers. Without LNP, changing a CMR's wireless telephone service provider requires changing the directory number. Changing a CMR's directory number can be inconvenient and expensive, particular for businesses that may have to contact their customers, run new advertisements, print new stationary, and so forth, as a result of obtaining a new directory number. Many subscribers might therefore be reticent to change their home wireless telephone service provider if doing so meant that they also had to change their CMR's directory number. For this reason, it is generally recognized that LNP would enhance competition in the provision of wireless telephone service.

The mobile directory number (MDN) assigned to a CMR is presently used as a mobile identification number (MIN) that uniquely identifies the CMR to the service provider. The first six digits of the CMR's MIN/mobile directory number (the NPA-NXX portion) uniquely identifies the CMR's home MSC. Other MSCs use the NPA-NXX to route telephone calls through the public switched telephone number to the CMR's home MSC. In addition, a host MSC receiving a registration request from a roaming CMR uses the CMR's MIN to validate the CMR for roaming service. The host MSC validates the CMR by sending a registration notification message to the operator of the CMR's HLR, which is typically located at the CMR's home MSC or a clearinghouse. This is accomplished by using, in part, the Signaling System 7 protocol and procedures. If the account associated with the CMR is in good standing, the operator of the CMR's HLR returns a validation response message to the host MSC. In response, the host MSC registers the CMR for roaming service.

MSCs across the United States and Canada are presently configured to default to using a CMR's MIN as the mobile directory numbers. This is then frequently used for billing and supplementary services, such as calling line ID, which require use of the originating MDN. These purposes rely on the MIN being the same as the CMR's directory number. That is, MSCs across the United States and Canada are presently configured to use a CMR's MIN/directory number to uniquely identify the CMR's home MSC when routing telephone calls to the CMR, to identify the location of the CMR's HLR when registering the CMR for roaming service, and for billing and calling line ID purposes. As a result, a CMR's MIN cannot presently be changed to a number other than the CMR's directory number without disrupting roaming service or reconfiguring virtually all of the MSCs across the United States and Canada to handle MINs that are distinct from the corresponding CMR's directory number.

Once LNP is implemented, however, a subscriber may change their service provider changing the CMR's directory number. For this reason, the first six digits of the CMR's directory number (the NPA-NXX) will no longer uniquely identify the CMR's home MSC. In designing the architecture for Wireless LNP, the industry has proposed separating the MIN from the mobile directory number (MDN). Specifically, the MIN is no longer the same value as the MDN. In a fully LNP-enabled telecommunications system, each CMR will be assigned a MIN and a separate MDN. The MW will by used for paging a mobile station and roaming registration purposes and, thus, will identify the corresponding CMR's home MSC. As such, the CMR's MIN will change whenever the CMR's home MSC or service provider changes. The MDN, on the other hand, will remain the same when the CMR's home MSC changes and is used for routing of calls and identifying the originator of a call.

Reconfiguring an MSC to support CMRs with separate MINs and MDNs is also referred to as making the MSCs LNP enabled or supporting MIN/MDN separation. Separating MINs and MDNs would not disrupt roaming service if all of the MSCs that act upon the MIN could be simultaneously updated to make them LNP enabled. But this is unlikely to occur because the Federal Communications Commission has initially ordered LNP implementation in only the largest 100 metropolitan service areas. Moreover, it is not known if or when Canada and other areas in the North American Number Plan Area will implement LNP. It therefore appears that LNP may be partially implemented in the United States and Canada for the foreseeable future.

Partially implementing LNP could interfere with the provision of roaming service to ported subscribers in those areas that are not LNP enabled. For example, if a host MSC uses the CMR's MIN rather than its MDN as the originating directory number, interexchange carriers may use the MIN value for billing purposes, potentially resulting in incorrect billing of toll calls. Moreover, the calling line ID feature, which may be used by emergency personnel to trace the origin of an emergency (e.g., 911) telephone call, will not allow proper callback to the originating mobile subscriber.

On the other hand, waiting for all of the MSCs in the United States and perhaps Canada to be upgraded before implementing LNP would further delay the implementation of LNP in the largest 100 metropolitan service areas in the United States. It is generally recognized that both roaming and LNP are important aspects of wireless telephone service. Nevertheless, a plan has not yet been developed that will allow partial LNP implementation in the United States and Canada while maintaining roaming in those areas that are not LNP enabled.

Thus, there is a need for a method and system that will allow partial LNP implementation in the United States and Canada while maintaining roaming service in those areas that are not LNP enabled.

SUMMARY OF THE INVENTION

The present invention meets the needs described above in a method and system for providing roaming service in a telecommunications system that is partially enabled for local number portability (LNP). Generally described, the invention includes a host mobile switching center (MSC) that receives a registration request from a roaming cellular mobile radiotelephone (CMR). The host MSC generates a notification message for the roaming CMR. If the host MSC is configured for LNP, it includes in the notification message an indication that the host MSC is configured for LNP, that is, supports the separation of the MIN and MDN, for example by setting an LNP protocol element in the notification message. The host MSC then transmits the notification message to the operator of the CMR's home location register (HLR), which checks the notification message to determine whether the host MSC is configured for LNP, for example by checking whether the LNP protocol element is set. If the host MSC is configured for LNP, the operator of the CMR's HLR transmits a response message instructing the host MSC to register the roaming CMR for automatic roaming service.

The operator of the HLR obtains the CMR's mobile identification number (MIN) from the notification message. Based on the mobile identification number, the HLR looks up the CMR's mobile directory number (MDN) and transmits the CMR's MDN back to the host MSC in the response message. The host MSC then uses this CMR's MDN in processes that require the CMR's telephone number. This includes, but is not limited to, when creating billing records for the CMR, transmitting a calling line identification number for the CMR on call origination, and transmitting a calling line identification number for the CMR to an emergency dispatch operator.

If the host MSC is not configured for LNP, the home MSC transmits a response message instructing the host MSC to register the roaming CMR for restricted roaming service. The host MSC may then authorize the roaming cellular mobile radiotelephone only to receive incoming telephone calls and restrict outgoing telephone calls. In addition, the operator of the HLR may include in the response message a dedicated directory number that the roaming CMR is authorized to use for placing outgoing telephone calls. In response, the host MSC may authorize the roaming CMR to place outgoing telephone calls to the dedicated directory number received in the response message.

In addition, the host MSC may receive a telephone call originated by the CMR to the dedicated directory number. In response, the host MSC connects the telephone call to an intelligent call processing platform associated with the dedicated directory number. The intelligent platform may then receive a terminating station directory number signalled via dual-tone multi-frequency (DTMF) input from the roaming CMR and connect the telephone call to a terminating station associated with the terminating station directory number. In this manner, the invention allows roaming telephone service to be provided to roaming CMRs served by both LNP-enabled and non LNP-enabled host MSCs.

That the present invention improves over the drawbacks of the prior art and how it achieves the advantages described above will become apparent from the following detailed description of exemplary embodiments and the appended claims and drawings.

DETAILED DESCRIPTION OF EXEMPLARY EMBODIMENTS

Figure 1:
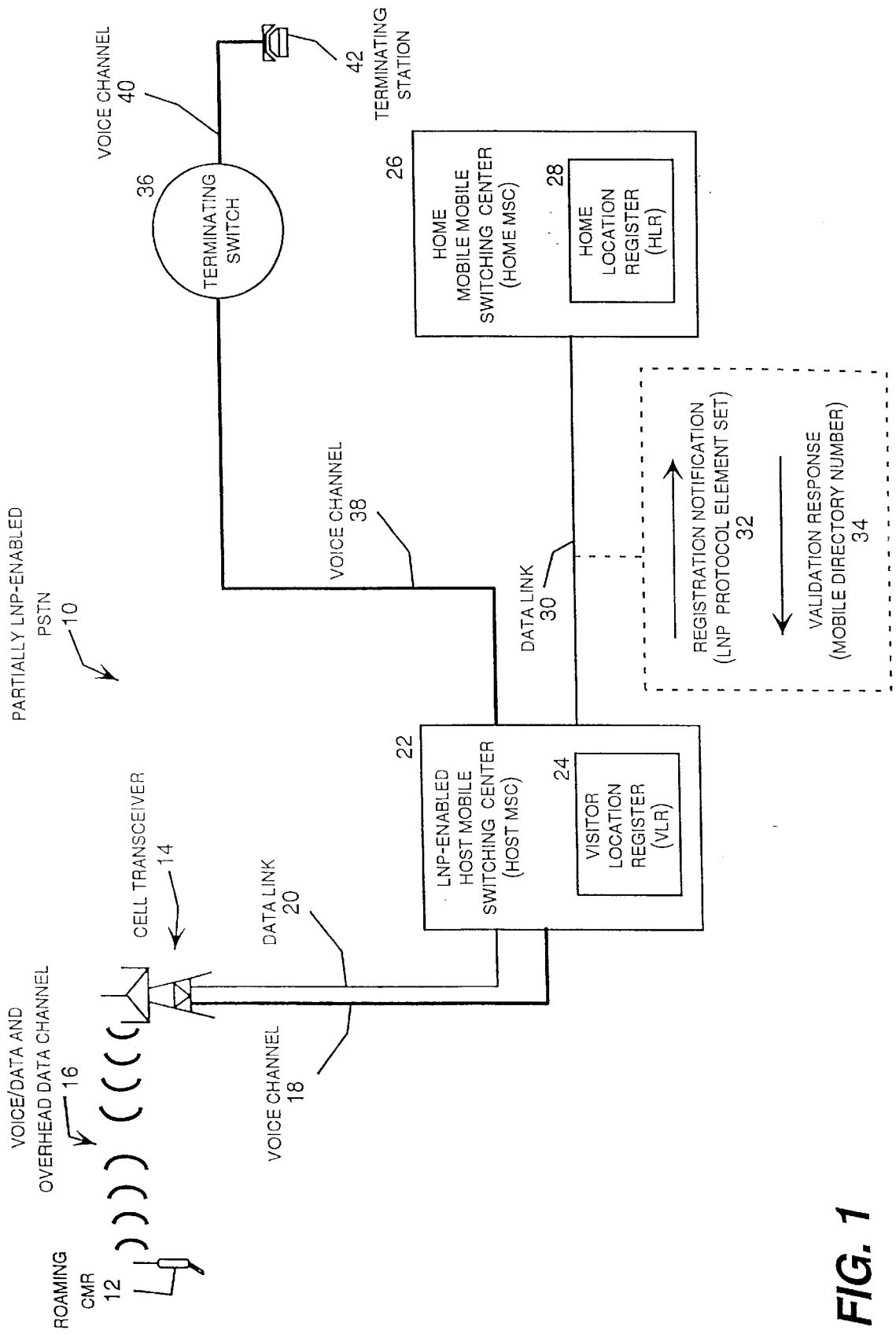
FIG. 1 is a functional block diagram of an illustrative portion of a telecommunications system that is partially enabled for local number portability, including a mobile switching center that is enabled for local number portability.

The present invention may be embodied in a system configured for providing roaming service in a telecommunications system that is partially enabled for local number portability (LNP). A new LNP protocol element is defined for registration notification messages. A roaming cellular mobile radiotelephone (CMR) transmits its mobile identification number (MIN) in a registration request, which is received by a host mobile switching center (MSC). The first six digits of the CMR's MIN uniquely identifies the CMR's home MSC. The host MSC validates the roaming CMR by sending a registration notification message, including the CMR's MIN, to the operator of the CMR's home location register (HLR), which is typically located at the CMR's home MSC or at a clearinghouse.

If the host MSC is LNP enabled, it sets the LNP protocol element in the registration notification message. If the host MSC has not been upgraded for LNP, it will not be configured to set the LNP protocol element in the registration notification message. Upon receiving the registration notification message, the operator of the CMR's HLR checks the LNP protocol element to determine whether the host MSC is LNP enabled. If the host MSC is LNP enabled, the operator of the CMR's HLR returns a validation response message to the host MSC authorizing the CMR for automatic roaming service. The validation response message includes the CMR's mobile directory number (MDN). In response, the host MSC registers the CMR for automatic roaming service and uses the CMR's MDN for processes that require the telephone number of the CMR subscriber, particularly in populating the Calling Party Number parameters in Signaling System 7 ISUP signaling.

If the host MSC is not LNP enabled, the operator of the CMR's HLR returns a validation response message to the host MSC authorizing the CMR for restricted roaming service. This validation response message does not include the CMR's mobile directory number (MDN) because the host MSC is not configured to handle the MDN. Rather, the operator of the HLR may transmit a dedicated "hot line"

directory number to the host MSC and instruct the host MSC to limit the CMR to receiving telephone calls and placing outgoing telephone calls to the "hot line" directory number. It should be noted that such instructions do not limit the CMR's ability to place an emergency telephone call (e.g., 911 call). Dialing the "hot line" directory number connects the CMR with an intelligent platform that is typically operated by the CMR's home wireless telephone service provider. The intelligent platform is operative to bridge telephone calls received from the CMR to terminating stations associated with terminating station directory numbers received from the CMR through in band DTMF signaling. In this manner, the invention allows roaming telephone service to be provided to a roaming CMR served by both LNP-enabled and non LNP-enabled host MSCs.

The "system capabilities" field included in a IS-41 protocol standard "registration notification" message may be used to define the LNP protocol element. Those skilled in the art will appreciate that other types of indications may be used to indicate that the host MSC is LNP enabled, such a protocol element in a data field other then the "system capabilities" field of the registration notification message, an indication in a message other than the registration notification message, a code embedded in a message, a header, a flag, the use of a predefined message type, the use of a predefined message channel, and so forth. In addition, the notification message transmitted from the host MSC to the operator of the CMR's HLR may be a message other than a standard registration notification message, such as another standard message type or a new message type. Similarly, the response message transmitted from the operator of the CMR's HLR back to the host MSC may be a message other than a standard validation response message, such as another standard message type or a new message type.

CELLULAR MOBILE RADIOTELEPHONE SYSTEM

A Cellular Mobile Radiotelephone System (CMR system) is generally characterized by dividing a radio coverage area into smaller coverage areas or "cells" using low power transmitters and coverage-restricted receivers. The limited coverage area of each cell allows the radio channels used in one cell to be reused in another cell. As a CMR moves across the boundary of one cell and into an adjacent cell, control circuitry associated with the cells detects that the signal strength of the CMR in the just-entered cell is stronger. In response, the just-exited cell "hands-off" communications with the CMR to the just-entered cell. Each cell relays bi-directional communications between CMRs in its coverage area and an MSC, which connects the CMR system to the public switched telephone network (PSTN).

The MSC is preferably compatible with the EIA/TIA Interim Standard 41 (IS-41 standard). These standards are well known to those skilled in the art and, therefore, will only be summarized in this specification. Basically, a CMR system typically uses a pair of radio frequencies for each radio channel and each cell. Each cell typically includes at least one overhead data channel (also referred to as a signaling channel or an access channel), and several voice/data channels. The control channel is dedicated to receiving requests for service from CMRs, to paging selected CMRs, and to instructing the various CMRs to tune to predetermined voice/data channels, over which a voice channel conversation or data communication may take place. Accordingly, the overhead data channel is normally responsible for receiving and transmitting data to control the communication actions of the MSC and the CMRs.

The control channel normally includes a forward communications channel (FOCC) for communications from the MSC to a CMR and a reverse communications channel (RECC) for communications from the CMR to the MSC. When a CMR originates a telephone call, it transmits at least one data message to the serving cell of the CMR system. This request for a cellular voice channel, commonly referred to as a "call origination" message, can be implemented as a message or signal having certain defined fields. These fields contain information, including the CMR's MIN, that allows the MSC to identify the CMR that originated the message.

The call origination message is transmitted by the CMR first to the cell serving the CMR, and then through the overhead data channel to the MSC serving the cell. The host MSC usually determines whether the CMR is a subscriber of that particular cellular system, i.e., a "home-system subscriber," by searching its own HLR. If the CMR is not a home-system subscriber, the MSC typically communicates with the CMR's host MSC system or a clearinghouse to determine whether the CMR is an authorized subscriber of another cellular system, i.e., a "roamer" authorized to receive cellular telephone service within the service area of the given cellular system. If the MSC determines that the CMR is a roamer authorized to receive cellular telephone service within the service area of the given cellular system, the MSC enters identification information for the CMR in a visitor location register (VLR) for the given cellular system. The MSC then routes the telephone call requested in the call origination message to a terminating switch identified by the called-party directory number. The terminating switch then routes the telephone call to the indicated terminating station to complete the telephone call.

The CMR identifies itself as actively present within the system through a process known as "autonomous registration" when the CMR first powers up and periodically while the CMR is active but not in use. In other words, the CMR periodically attempts to register for telephone service by transmitting an autonomous registration message, which is a data packet similar to a call origination message. Like a call origination signal, the autonomous registration message, also referred to as a registration or an identification signal, typically includes identification information for the CMR, including the CMR's MIN. Unlike a call origination message, however, the autonomous registration message does not include a data field containing the digits of a dialed directory number. A call origination message may also include a flag to distinguish this message from an autonomous registration message.

The original design intent of autonomous registration was to improve the efficiency of potential future call deliveries by keeping the MSC informed of the approximate whereabouts of each individual CMR, and to reduce paging channel load by lessening the need to page all cells to find a particular CMR. When the MSC is informed of a CMR's most recent location, it can later "page" or attempt to ring the CMR only in the cell or area in which it was last known to be located. Additional cells would be paged only if the initial page did not locate the particular CMR. Thus, the autonomous registration function is implemented by messages periodically and autonomously sent from the CMR to the serving cell at an interval specified in data parameters previously received from the cell by the cellular unit.

A person using or attempting to use a CMR in a service area outside the home service area is said to be "roaming," and the person (and the associated CMR unit) is commonly referred to as a "roamer." For example, if a subscriber of one CMR system enters the service area of another CMR system and powers on the CMR, the newly-entered or host CMR system receives an autonomous registration message via the overhead data channel of the particular cell in which the CMR then resides. The CMR system interprets the autonomous registration message as a request that the CMR register for operation in the particular cellular system as a roamer, which is also referred to as a "roamer registration request." In response, the identification information transmitted by the CMR is transmitted to the MSC, which quickly ascertains whether the CMR is a subscriber of the local cellular service provider (i.e., a home-system subscriber) or a subscriber of another CMR system (i.e., a roamer).

If the CMR unit is a roamer, the MSC sends a registration notification message to the operator of the CMR's HLR, which is typically located at the CMR's home MSC or in a clearinghouse. This message indicates that the particular CMR unit has attempted to register as a roamer with another host MSC and requests information about the validity of the identification information received from the CMR unit. The operator of the CMR's HLR responds by transmitting a validation response message containing the valid identification information for the roamer. If the validation message indicates that the roamer identification information received from the CMR is valid, the host MSC at the foreign cellular system adds the CMR to its list of registered users and the home cellular system adds the CMR to a list of roamers that are out of the home-system service area. The validation message may also include customer service profile information for the registering CMR, typically defining a set of communication services that are authorized for use by the particular CMR. For example, the customer service profile may define limitations on services to be provided to the CMR, such as access to long distance services, authorization for the CMR to only originate (and not receive) telephone calls, and the like.

When this same CMR unit registers with yet another CMR system, the database at the MSC for the home system observes that the CMR has moved again and updates its list of where the roaming CMR has most recently registered in a database system. In addition, the MSC sends a message to the foreign system where the CMR was previously registered informing this system that the roaming CMR unit has now moved on. This allows the foreign system where the CMR was previously registered to delete that CMR from its list of registered roamers. In this manner, the database at a foreign MSC does not become cluttered with data identifying previously-registered roamers after the roamers have left the MSC's service area.

The conventional CMR system as described above is configured to quickly process call origination and autonomous registration messages to facilitate a fluid movement of CMRs throughout a number of cooperating CMR systems operated by different CMR service providers. In sum, the combined CMR system has the capability to track a large number of CMRs as they move about, and to provide continuous service to these CMRs as home-system subscribers and as roamers. The various CMR service providers validate and invalidate the CMR units operated by their subscribers and may also specify customer service profile information to impose service limitations for their subscribers. Validation and customer service profile information is transmitted to other CMR service providers so that they may provide service to a roamer in accordance with the customer service profile established by the CMR's home-system service provider.

Providing Roaming Service In A Partially LNP-Enabled Telecommunications System

Referring now to the drawings, in which like numerals indicate like elements throughout the several figures, exemplary embodiments of the present invention will be described with reference to the appended drawings. FIG. 1 is a functional block diagram of an illustrative portion of a partially LNP-enabled telecommunications system 10. This means that some MSCs are LNP enabled, whereas other MSCs are not LNP enabled. In addition, certain CMRs may have MDNs that are different from their MINs. For those CMRs that have not ported to a new MSC, the MIN may still be the same as the MDN. For those CMRs that have ported to a new MSC, however, the MDN will generally be different from the MIN.

In this partially LNP-enabled system, a roaming CMR 12 is in communication with a cell transceiver 14 over a wireless data and voice channel communication link 16. The cell transceiver 14 is connected by way of a voice channel 18 and a data link 20 with an MSC 22, which serves as a host MSC that provides the roaming CMR 12 with roaming telecommunication service. The cell transceiver 14 relays data and voice channel communications between the roaming CMR 12 and the host MSC.22. The host MSC 22, in turn, serves as an interface between the roaming CMR 12 and the public switched telephone network.

The roaming CMR 12 registers for roaming service with the host MSC 22 by transmitting a registration request. The registration request typically may be an autonomous registration message or a call origination message. In either case, if the roaming CMR 12 is not already registered with the host MSC 22, the host MSC 22 treats the autonomous registration message or call origination message as a registration request. Once the roaming CMR 12 is registered for roaming service, the host MSC 22 maintains registration information for the roaming CMR 12 in a visitor's location register (VLR) 24. The VLR 24 typically retains registration information for a roaming CMR for 24 hours, and then deletes the registration information to make room to register new roaming CMRs.

The VLR 24 is configured to store service instructions that allow a CMR to be registered for roaming service with or without restrictions to be applied by the host MSC 22. For example, the VLR 24 typically permits the roaming CMR 12 to be registered for unrestricted or automatic roaming service. Automatic roaming service generally allows the roaming CMR 12 to place a telephone call to a desired terminating station by dialing the directory number assigned to the desired terminating station without additional steps or limitations applied by the host MSC 22.

The VLR 24 also permits the roaming CMR 12 to be registered for restricted roaming service. Restricted roaming service generally allows the roaming CMR 12 some degree of service, but imposes service restrictions applied by the host MSC 22. For example, the host MSC 22 may allow the roaming CMR 12 only to receive incoming telephone calls and place outgoing telephone calls to an emergency dispatch operator (e.g., 911 telephone calls). The host MSC 22 may also allow the roaming CMR 12 to place additional outgoing telephone calls to one additional directory number stored in the VLR 24 in association with the roaming CMR 12. This additional directory number is referred to herein as a "hot line" directory number.

In the example illustrated in FIG. 1, the host MSC 22 is LNP enabled, which means that it is configured to handle MINs that are separate from associated MDNs. This allows the host MSC 22 to provide the roaming CMR 12 with automatic roaming service. The roaming CMR 12 is a subscriber of a wireless carrier that operates the CMR's home MSC 26, where the CMR's HLR 28 is typically located. In the example shown in FIG. 1, the CMR's HLR 28 is located at the CMR's home MSC 26. Those skilled in the art will understand that, if the CMR's HLR 28 is implemented as a separate, stand alone HLR the procedures are similar to those described below except that the host MSC 22 communicates with the HLR directly rather than via the CMR's home MSC 26.

The host MSC 22 is connected to the CMR's home MSC 26 by way of a data link 30, which allows messages to be transmitted between the host MSC 22 and the CMR's HLR 28. This may be implemented as a point-to-point communications facility or using the capabilities of Signaling System 7. To begin the registration process, the roaming CMR 12 transmits its MIN to the host MSC 22 in a registration request. The first six digits of the MIN identify the CMR's home MSC 26, where CMR's HLR 28 is located. The host MSC 22 transmits the CMR's MIN to the CMR's home MSC 26 in a registration notification message 32. To signify that the host MSC 22 in LNP enabled, the host MSC 22 sets an LNP protocol element in the registration notification message 32. For example, the "system capabilities" field included in a standard registration notification message may be used to define the LNP protocol element.

The CMR's home MSC 26 receives the registration notification message 32 and checks the LNP protocol element to determine whether the host MSC 22 is LNP enabled. As the LNP protocol element is set in this example, the home MSC 26 looks up the CMR's MDN in the HLR 28. If the account associated with the roaming CMR 12 is in good standing and the associated subscriber's profile, if any, does not restrict the CMR 12 from roaming in the service area served by the host MSC 22, the home MSC 26 sends the CMR's MDN to the host MSC 22 in a validation response message 34 that instructs the host MSC 22 to provide the CMR 12 with automatic roaming service.

The host MSC 22 receives the validation response message 34 and, in response, stores the CMR's MDN in the VLR 24 and registers the CMR 12 for automatic roaming service. When providing the automatic roaming service, the host MSC 22 uses the CMR's MDN, rather than its MIN, for processes that requires the use of the CMR's telephone number. The CMR 12 may then use the roaming service without disrupting the billing or calling line ID features implemented by the host MSC.

For example, the CMR 12 may place a telephone call to a terminating station 42 by dialing a directory number (or one plus the directory number) assigned to the terminating station. The MSC 22 routes the telephone call to a terminating switch 36 that serves the terminating station 42 through a voice channel 38 in the usual manner. The terminating switch 36 then routes the telephone call to the terminating station 42 through a voice channel 40, again in the usual manner. These communication routing procedures are well known to those skilled in the art and, therefore, will not be described in this specification.

Figure 2:
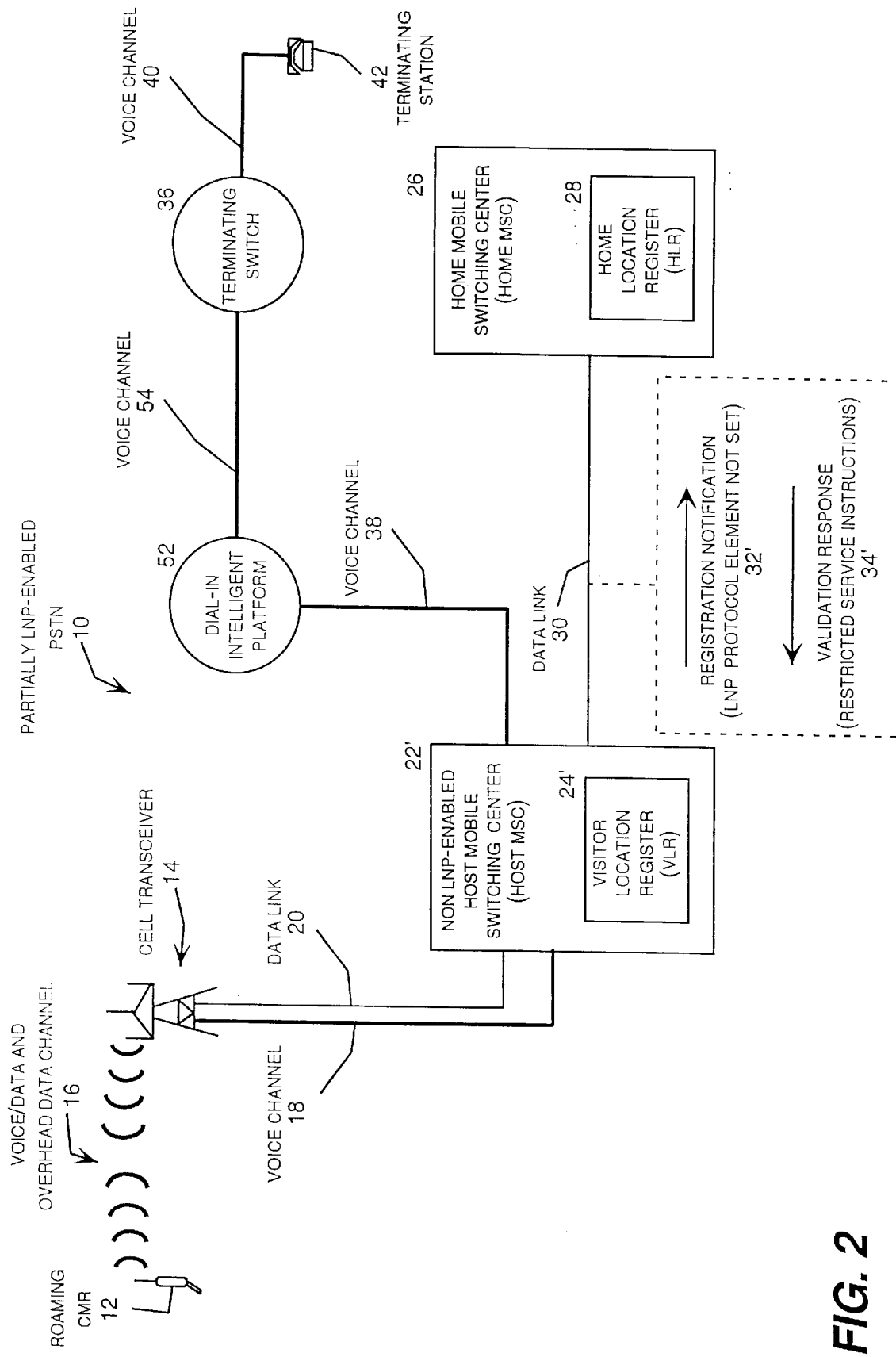
FIG. 2 is a functional block diagram of an illustrative portion of a telecommunications system that is partially enabled for local number portability, including a mobile switching center that is not enabled for local number portability.

FIG. 2 is a functional block diagram of the illustrative portion of the telecommunications system 10 including a non LNP-enabled host MSC 22'. The example illustrated in FIG. 2 is similar to the example illustrated in FIG. 1, except that the MSC 22' is not LNP enabled. Thus, the MSC 22' is not configured to set the LNP protocol element in the registration notification message 32'. The CMR's home MSC 26 checks the LNP protocol element and recognizes that the host MSC 22' is not LNP enabled. Because the host MSC 22' is not configured to use the CMR's MDN, the home MSC 26 does not return the CMR's MDN to the host MSC 22'. Instead, if the account associated with the roaming CMR 12 is in good standing and the associated subscriber's profile, if any, does not restrict the CMR 12 from roaming in the service area served by the host MSC 22', the home MSC 26 sends a validation response message 34' to the host MSC 22' instructing the host MSC 22' to provide the CMR 12 with restricted roaming service.

Restricted roaming service generally allows the roaming CMR 12 some degree of service, but imposes some service restrictions applied by the host MSC 22'. For example, the host MSC 22' may allow the roaming CMR 12 only to receive incoming telephone calls and place outgoing telephone calls only to an emergency dispatch operator (e.g., 911 telephone calls). The host MSC 22' may also allow the roaming CMR 12 to place additional outgoing telephone calls to a dedicated "hot line" directory number stored in the VLR 24 in association with the roaming CMR 12.

To authorize "hot line" roaming service, the home MSC 26 includes the dedicated "hot line" directory number in the validation response message 34'. The host MSC 22', in turn, stores the dedicated "hot line" directory number in the VLR 24 in association with the roaming CMR 12. The host MSC 22' subsequently allows the roaming CMR 12 to receive incoming telephone calls and to place outgoing telephone calls only to an emergency (e.g., 911) directory number and the dedicated "hot line" directory number.

Dialing the "hot line" directory number connects a telephone call between the CMR 12 and an intelligent platform 52 that is typically operated by the CMR's home wireless telephone service provider. The intelligent platform 52 is operative to bridge telephone calls received from the CMR 12 to terminating stations associated with terminating station directory numbers signaled via DTMF tones received from the CMR. For example, the intelligent platform 52 may prompt the operator of the CMR 12 to enter the directory number associated with a desired terminating station 42. In response to receiving the terminating station directory number, the intelligent platform 52 routes the telephone call to the terminating switch 36 that serves the terminating station 42 over a voice channel 54. The terminating switch 36 then routes the telephone call to the terminating station 42 over a voice channel 40 to connect the telephone call between the CMR 12 and the terminating station 42.

In addition to the procedures described above, in response to the registration notification message, the CMR's home MSC 26 may look up the CMR's MDN in the HLR 28. If the CMR's MDN is the same as the CMR's MIN, then the MIN may be used for billing and calling line ID purposes in the usual manner. Thus, in this case, the home MSC 26 may instruct the non LNP-enabled host MSC 22' to provide the CMR 12 with automatic roaming service.

Figure 3:
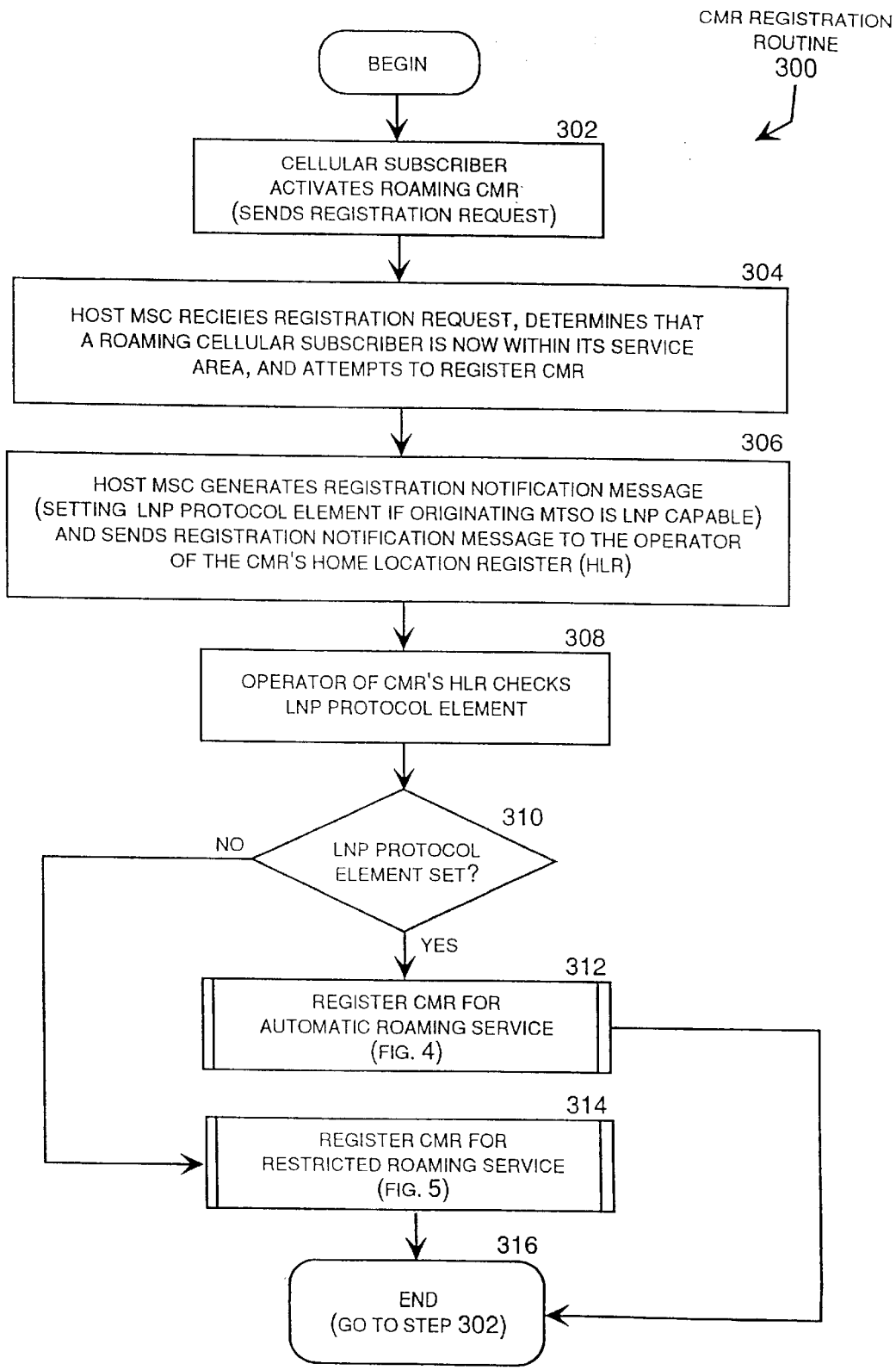
FIG. 3 is a logic flow diagram illustrating a method for providing roaming service in a telecommunications system that is partially enabled for local number portability.

FIG. 3 is a logic flow diagram illustrating an exemplary method 300 for providing roaming service in the partially LNP-enabled telecommunications system 10. The following description of routine 300 will also refer to structural elements shown in FIG. 1. In step 302, the roaming cellular subscriber activates the roaming CMR 12. The roaming CMR 12 then transmits a registration request, such as an autonomous registration message, which includes the CMR's MIN. Step 302 is followed by step 304, in which the host MSC 22 receives the registration request. The host MSC 22 also determines that the roaming CMR 12 is within the service area covered by the MSC and attempts to register the CMR for roaming service.

Step 304 is followed by step 306, in which the host MSC 22 generates a registration notification message 32 including the CMR's MIN. If the host MSC 22 is LNP enabled, it sets the LNP protocol element in the registration notification message 32. On the other hand, if the host MSC 22 is not LNP enabled, it will not be configured to set the LNP protocol element in the registration notification message 32, and the LNP protocol element will not be set. The host MSC 22 then transmits the registration notification message 32 to the operator of the CMR's HLR 28, typically the CMR's home MSC 26. The first six digits of the CMR's MIN identifies the location of the CMR's HLR 28.

Step 306 is followed by step 308, in which the operator of the CMR's HLR 28 (in this example the CMR's home MSC 26) receives the registration notification message and checks the LNP protocol element. Step 306 is followed by step 308, in which the operator of the CMR's HLR 28 determines whether the LNP protocol element is set. If the LNP protocol element is set, the "YES" branch is followed to routine 312, in which the CMR 12 may be registered for automatic roaming. Routine 312 is described below with reference to FIG. 4.

If the LNP protocol element is not set, the "NO" branch is followed to routine 314, in which the CMR 12 may be registered for restricted roaming service. Routine 314 is described below with reference to FIG. 5. Routine 312 may optionally return to routine 314 (step 508 shown on FIG. 5) if the CMR 312 is not authorized for automatic roaming service. Alternatively, routine 312 may return to the "END" step 316. Routine 314 also returns to the "END" step 316.

Figure 4:
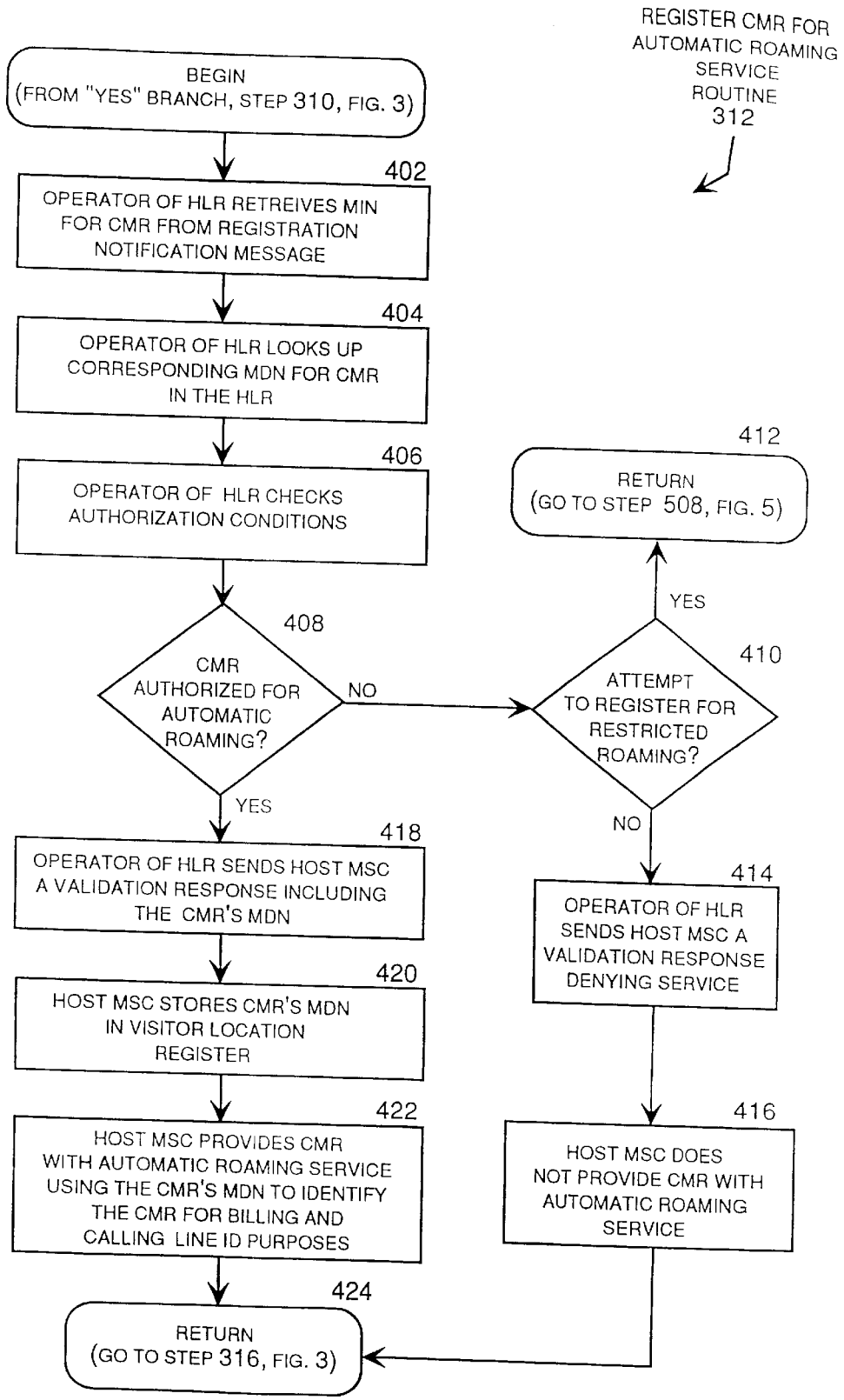
FIG. 4 is a logic flow diagram illustrating a method for registering a cellular mobile radiotelephone for automatic roaming service in a telecommunications system that is partially enabled for local number portability.

FIG. 4 is a logic flow diagram illustrating routine 312 for registering the CMR 12 for automatic roaming service. The following description of routine 312 will also refer to structural elements shown in FIG. 1. Routine 312 follows the "YES" branch from step 310 shown in FIG. 3. In step 402, the operator of the roaming CMR's HLR 28 retrieves the CMR's MIN from the registration notification message 32. Step 402 is followed by step 404, in which the operator of the HLR 28 looks up the CMR's MDN in the HLR. Step 402 is followed by step 404, in which the operator of the HLR 28 checks the other authorization conditions denoted in the HLR. The HLR 28 may indicate that the account associated with the CMR 12 is not in good standing.

For example, the subscriber may have discontinued service, may have payments overdue, may have reported the CMR as stolen, and so forth. The HLR 28 may also include a service profile for the CMR 12 indicating roaming restrictions requested by the subscriber, such as instructions to restrict roaming to incoming calls, restrict outgoing calls to a particular geographic area, restrict outgoing calls to a particular directory number, obtain an alternate payment source for roaming service, and so forth. Those skilled in the art will appreciate that many other types of roaming service restrictions could be reflected in the CMR's service profile.

Step 406 is followed by step 408, in which the operator of the HLR 28 determines whether the CMR 12 is authorized for automatic roaming. If the CMR 12 is not authorized for automatic roaming, then the "NO" branch is followed to step 410, in which the operator of the HLR 28 determines whether it should attempt to register the CMR for restricted roaming service. For example, if the account associated with the CMR is valid but past due, the HLR 28 may decide to authorize the CMR for restricted roaming service, which will route all outgoing telephone calls (except emergency "911" calls) through an intelligent platform controlled by the CMR's home wireless telephone service provider. At this intelligent platform, the operator of the CMR could be prompted to provide an alternative payment source, such as a prepaid telephone card, a credit card, or a debit account.

Figure 5:
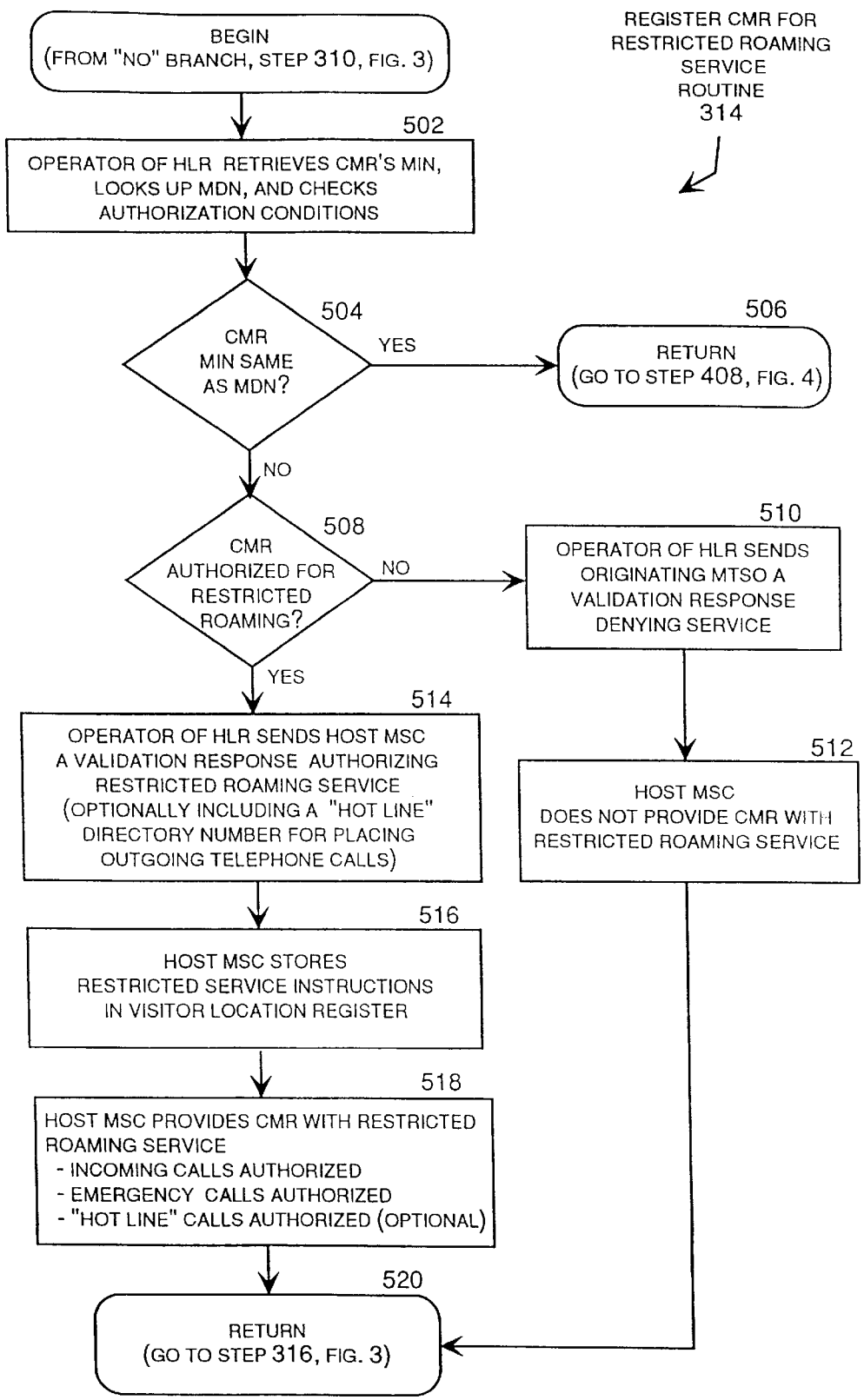
FIG. 5 is a logic flow diagram illustrating a method for registering a cellular mobile radiotelephone for restricted roaming service in a telecommunications system that is partially enabled for local number portability.

If the operator of the HLR 28 elects to attempt to register the CMR for restricted roaming service, the "YES" branch is followed from step 410 to the "RETURN" step 412, which goes to step 508 shown on FIG. 5. If the operator of the HLR 28 elects not to attempt to the register the CMR 12 for restricted roaming service, then the "NO" branch is followed from step 410 to step 414, in which the operator of the HLR 28 sends the host MSC 22 a validation response message 34 instructing the host MSC to deny roaming service to the CMR. Step 414 is followed by step 416, in which the host MSC denies roaming service to the CMR 12. Step 416 is followed by the "RETURN" step 424, which returns to step 316 shown in FIG. 3.

Those skilled in the art will appreciate that the MSC 22 may take additional steps in an attempt to obtain a payment source for roaming service. For example, if the registration request was a call origination message and a voice channel communication is connected between the CMR 12 and the MSC 22, the MSC may play an announcement to the CMR explaining the situation. At this point, the host MSC 22 may attempt to obtain an alternate payment source for roaming service or disconnect the communication. Alternatively, if the registration request was an autonomous registration message, the host MSC 22 may place a telephone call to the CMR 12 and announce that the CMR 12 has entered the service area of the host MSC and attempt to obtain an alternate payment source. In addition, even if an alternative payment source is not obtained, the host MSC 22 may elect to provide the CMR 12 certain minimal services, such as allowing the CMR to place emergency "911" telephone calls.

Referring again to step 408, if the CMR 12 is authorized for automatic roaming service, the "YES" branch is followed to step 418, in which the operator of the HLR 28 sends the host MSC 22 a validation response message 34 including the CMR's MDN and instructing the host MSC 22 to register the CMR for automatic roaming service. Step 418 is followed by step 420, in which the host MSC 22 stores the CMR's MDN in the VLR 24 and registers the CMR for automatic roaming service. Step 420 is followed by step 422, in which the host MSC 22 provides the CMR 12 with automatic roaming service and uses the CMR's MDN to identify the CMR for billing and calling line ID purposes. Step 422 is followed by the "RETURN" step 424, which returns to step 316 shown in FIG. 3.

FIG. 5 is a logic flow diagram illustrating a routine 314 for registering the CMR 12 for restricted roaming service in the partially LNP-enabled telecommunications system 10. The following description of routine 314 will also refer to structural elements shown in FIG. 2. Routine 314 follows the "NO" branch from step 310 shown in FIG. 3.

In step 502, the operator of the CMR's HLR 28 retrieves the CMR's MIN from the registration notification message 32', looks up the CMR's MDN in the HLR, and checks the other authorization conditions denoted in the HLR. Step 502 is followed by step 504, in which the operator of the HLR 28 determines whether the CMR's MIN is the same as its MDN, indicating that using the MIN for billing and calling line ID purposes will not cause problems. If the CMR's MIN is the same as its MDN, the "YES" branch is followed to the "RETURN" step 506, which goes to step 408 shown in FIG. 4. From this point, the CMR 12 may be registered for automatic or restricted roaming in accordance with the other authorization conditions reflected in the HLR 28 for the CMR.

If the CMR's MIN is not the same as its MDN, the "NO" branch is followed to step 508, in which the operator of the HLR 28 determines whether the CMR 12 is authorized for restricted roaming service. If the CMR 12 is not authorized for restricted roaming service, the "NO" branch is followed to step 510, in which the operator of the HLR 28 sends the host MSC 22' a validation response message 34' instructing the host MSC to deny roaming service to the CMR. Step 510 is followed by step 512, in which the host MSC 22' denies roaming service to the CMR 12. Step 512 is followed by the "RETURN" step 520, which returns to step 316 shown in FIG. 3.

Again, those skilled in the art will appreciate that the MSC 22' may take additional steps in an attempt to obtain a payment source for roaming service. In addition, even if an alternative payment source is not obtained, the host MSC 22 may elect to provide the CMR 12 certain minimal services. In any situation, the CMR subscriber is always allowed to place an emergency "911" telephone call.

Referring again to step 508, if the CMR 12 is authorized for restricted roaming service, the "YES" branch is followed to step 514, in which the operator of the HLR 28 sends the host MSC 22' a validation response message 34' instructing the host MSC 22' to register the CMR for restricted roaming service. Step 514 is followed by step 516, in which the host MSC 22' stores the restricted service instructions, which may include a dedicated "hot line" directory number, in the VLR 24 and registers the CMR for restricted roaming service. Step 516 is followed by step 518, in which the host MSC 22' provides the CMR 12 with restricted roaming service. Step 518 is followed by the "RETURN" step 520, which returns to step 316 shown in FIG. 3.

Restricted roaming service typically allows the CMR 12 to receive incoming telephone calls and to place emergency (e.g., 911) outgoing telephone calls. In addition, the operator of the HLR 28 may transmit a dedicated "hot line" directory number to the host MSC 22' and instruct the host MSC to limit the CMR to receiving telephone calls, making emergency telephone calls (e.g., 911), and placing outgoing telephone calls to the "hot line" directory number. The dedicated "hot line" directory number, which is typically transmitted to the MSC 22' in the validation response message 34', allows CMR 12 to obtain roaming telephone service while it is operated within the service area of the non LNP-enabled host MSC 22'.

The MSC 22 may take additional steps in an attempt to inform the operator of the CMR 12 of the availability of the dedicated "hot line" directory number for roaming service. For example, the "hot line" directory number may be advertised in print and broadcast media, advertised in bill inserts, or displayed on billboards along highways in the area. If the registration request was a call origination message and a voice channel communication is connected between the CMR 12 and the MSC 22, the MSC may play an announcement to the CMR explaining the availability of the dedicated "hot line" directory number. Alternatively, if the registration request was an autonomous registration message, the host MSC 22 may place a telephone call to the CMR 12 and announce that the CMR 12 has entered the service area of the host MSC and explain the availability of the dedicated "hot line" directory number.

In view of the foregoing, it should be appreciated that the invention provides a method and system that allows partial LNP implementation while maintaining roaming service in those areas that are not LNP enabled. It should be understood that the foregoing relates only to exemplary embodiments of the present invention, and that numerous changes may be made therein without departing from the spirit and scope of the invention as defined by the following claims.

What is claimed is:

1. A method for providing roaming service in a telecommunications system that is partially configured for local number portability, comprising the steps of:

receiving a registration request from a roaming cellular mobile radiotelephone at a host mobile switching center;

generating a notification message for the roaming cellular mobile radiotelephone;

if the host mobile switching center is configured for local number portability, including in the notification message an indication that the host mobile switching center is configured for local number portability;

transmitting the notification message from the host mobile switching center to a home location register associated with the roaming cellular mobile radiotelephone;

at the home location register, checking the notification message to determine whether host mobile switching center is configured for local number portability; and if the host mobile switching center is configured for local number portability, transmitting a response message from the home location register to the host mobile switching center instructing the host mobile switching center to register the roaming cellular mobile radiotelephone for automatic roaming service.

2. The method of claim 1, wherein:

the step of including in the notification message an indication that the host mobile switching center is configured for local number portability comprises the step of setting a protocol element; and the step of checking the notification message to determine whether host mobile switching center is configured for local number portability comprises the step of checking whether the protocol element is set.

3. The method of claim 1, wherein the step of transmitting a response message from the home location register to the host mobile switching center instructing the host mobile switching center to register the roaming cellular mobile radiotelephone for automatic roaming service comprises the steps of:

obtaining a mobile identification number for the roaming cellular mobile radiotelephone from the notification message;

based on the mobile identification number, looking up a mobile directory number for the roaming cellular mobile radiotelephone; and transmitting the mobile directory number to the host mobile switching center in the response message.

4. The method of claim 3, further comprising the steps of:

at the host mobile switching center, using the mobile directory number to identify the telephone number associated with the roaming cellular mobile radiotelephone.

5. The method of claim 4, wherein the step of using the mobile directory number to identify the telephone number of the roaming cellular mobile radiotelephone comprises the step of using the mobile directory number to identify the roaming cellular mobile radiotelephone in connection with an operation selected from the group including:

creating a billing record for the roaming cellular mobile radiotelephone;

transmitting a calling line identification number for the roaming cellular mobile radiotelephone to a terminating station; and transmitting a calling line identification number for the roaming cellular mobile radiotelephone in signaling call establishment.

6. The method of claim 1, further comprising the steps of:
if the host mobile switching center is not configured for local number portability, transmitting a response message from the home location register to the host mobile switching center instructing the host mobile switching center to register the roaming cellular mobile radiotelephone for restricted roaming service.

7. The method of claim 6, further comprising the step of:
at the host mobile switching center, authorizing the roaming cellular mobile radiotelephone only to:
receive incoming telephone calls; and
place outgoing telephone calls to a specific telephone number.

8. The method of claim 6, wherein the step of transmitting a response message from the home location register to the host mobile switching center instructing the host mobile switching center to register the roaming cellular mobile radiotelephone for restricted roaming service comprises the steps of:
including in the response message a dedicated directory number that the roaming cellular mobile radiotelephone is authorized to use for placing outgoing telephone calls.

9. The method of claim 8, further comprising the step of:
at the host mobile switching center, authorizing the roaming cellular mobile radiotelephone only to:
receive incoming telephone calls;
place outgoing telephone calls to an emergency dispatch operator; and
place outgoing telephone calls to a specified number.

10. The method of claim 8, further comprising the step of:
at the host mobile switching center, receiving a telephone call directed to the dedicated directory number from the roaming cellular mobile radiotelephone;
connecting the telephone call to an intelligent platform associated with the dedicated directory number;
at the intelligent platform, receiving a terminating station directory number from the roaming cellular mobile radiotelephone via DTMF signaling; and
connecting the telephone call to a terminating station associated with the terminating station directory number.

11. A computer storage medium storing a computer program which, when executed by a computer-controlled apparatus, causes the computer-controlled apparatus to perform the method of claim 1.

12. A computer-controlled apparatus operative for implementing the method of claim 1.

13. A method for providing roaming service in a telecommunications system that is partially configured for local number portability, comprising the steps of:
receiving a registration request from a roaming cellular mobile radiotelephone at a host mobile switching center;
generating a notification message for the roaming cellular mobile radiotelephone;
if the host mobile switching center is configured for local number portability, including in the notification message an indication that the host mobile switching center is configured for local number portability;
transmitting the notification message from the host mobile switching center to a home location register associated with the roaming cellular mobile radiotelephone;
at the home location register, checking the notification message to determine whether the host mobile switching center is configured for local number portability;
if the host mobile switching center is configured for local number portability:
obtaining a mobile identification number for the roaming cellular mobile radiotelephone from the notification message,
based on the mobile identification number, looking up a mobile directory number for the roaming cellular mobile radiotelephone,
transmitting the mobile directory number to the host mobile switching center in a response message, and
at the host mobile switching center, using the mobile directory number to identify the roaming cellular mobile radiotelephone.

14. The method of claim 13, wherein the step of using the mobile directory number to identify the roaming cellular mobile radiotelephone comprises the step of using the mobile directory number to identify the roaming cellular mobile radiotelephone in a billing record.

15. The method of claim 14, wherein the step of using the mobile directory number to identify the roaming cellular mobile radiotelephone comprises the step of using the mobile directory number as a calling line identification number transmitted in call establishment signaling.

16. The method of claim 14, further comprising the steps of, if the host mobile switching center is not configured for local number portability:
transmitting a response message from the home location register to the host mobile switching center instructing the host mobile switching center to register the roaming cellular mobile radiotelephone for restricted roaming service, the response message including a dedicated directory number that the roaming cellular mobile radiotelephone is authorized to use for placing outgoing telephone calls; and
authorizing the roaming cellular mobile radiotelephone only to:
receive incoming telephone calls,
place outgoing telephone calls to an emergency dispatch operator, and
place outgoing telephone calls to the dedicated directory number received in the response message.

17. The method of claim 13, wherein the step of using the mobile directory number to identify the roaming cellular mobile radiotelephone comprises the step of using the mobile directory number as a calling line identification number transmitted to a terminating station.

18. A telecommunications system partially configured for local number portability, comprising a host mobile switching center configured for:
receiving a registration request from a roaming cellular mobile radiotelephone;
generating a notification message for the roaming cellular mobile radiotelephone;
including in the notification message an indication that the host mobile switching center is configured for local number portability;
transmitting the notification message from the host mobile switching center to a home location register associated with the roaming cellular mobile radiotelephone;
receiving a response message from the home location register instructing the host mobile switching center to register the roaming cellular mobile radiotelephone for automatic roaming service; and in response to the response message, registering the roaming cellular mobile radiotelephone for automatic roaming service.

19. The telecommunications system of claim 18, wherein the host mobile switching center is further configured for:

including a mobile identification number for the roaming cellular mobile radiotelephone in the notification message; and receiving a mobile directory number for the roaming cellular mobile radiotelephone in the response message.

20. The telecommunications system of claim 18, wherein the host mobile switching center is further configured for using the mobile directory number to identify the roaming cellular mobile radiotelephone in connection with:

creating a billing record for the roaming cellular mobile radiotelephone;

transmitting a calling line identification number for the roaming cellular mobile radiotelephone to a terminating station; and transmitting a calling line identification number for the roaming cellular mobile radiotelephone in call establishment signaling.

21. A telecommunications system partially configured for local number portability, comprising:

a host mobile switching center configured for:
receiving a registration request from a roaming cellular mobile radiotelephone,
generating a notification message for the roaming cellular mobile radiotelephone,
transmitting the notification message from the host mobile switching center to a home location register associated with the roaming cellular mobile radiotelephone; and the home location register configured for:
receiving the notification message from the host mobile switching center,
checking the notification message for an indication that the host mobile switching center is configured for local number portability and determining that the host mobile switching center is not configured for local number portability, and
in response to determining that the host mobile switching center is not configured for local number portability, transmitting the response message instructing the host mobile switching center to register the roaming cellular mobile radiotelephone for restricted roaming service.

22. The telecommunications system of claim 21, wherein the host mobile switching center is further configured for:

receiving a response message from the home location register instructing the host mobile switching center to register the roaming cellular mobile radiotelephone for restricted roaming service; and in response to the response message, registering the roaming cellular mobile radiotelephone for restricted roaming service.

23. The telecommunications system of claim 22, wherein the host mobile switching center is further configured for authorizing the roaming cellular mobile radiotelephone only to:

receive incoming telephone calls; and place outgoing telephone calls to a specified number to an emergency dispatch operator.

24. The telecommunications system of claim 22, wherein the host mobile switching center is further configured for:

receiving in the response message a dedicated directory number that the roaming cellular mobile radiotelephone is authorized to use for placing outgoing telephone calls.

25. The telecommunications system of claim 22, wherein the host mobile switching center is further configured for authorizing the roaming cellular mobile radiotelephone only to:

receive incoming telephone calls, place outgoing telephone calls to the dedicated directory number received in the response message.

* * * * *

UNITED STATES PATENT AND TRADEMARK OFFICE
CERTIFICATE OF CORRECTION

PATENT NO.    : 6,253,081 B1                                                Page 1 of 1
DATED         : June 26, 2001
INVENTOR(S)   : Karl Koster It is certified that error appears in the above-identified patent and that said Letters Patent is hereby corrected as shown below:

<u>Title page,</u>
Item [73], insert the following:
-- [73]    Assignee:    BellSouth Intellectual Property Corporation, Wilmington, DE (US) --

Signed and Sealed this

Twenty-third Day of July, 2002

*Attest:*

JAMES E. ROGAN
*Attesting Officer*    *Director of the United States Patent and Trademark Office*